(12) United States Patent
Welle

(10) Patent No.: US 10,142,012 B2
(45) Date of Patent: Nov. 27, 2018

(54) CO-ORBITING LASER COMMUNICATIONS RELAY SATELLITE

(71) Applicant: The Aerospace Corporation, El Segundo, CA (US)

(72) Inventor: Richard P. Welle, Sunset Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 23 days.

(21) Appl. No.: 15/067,866

(22) Filed: Mar. 11, 2016

(65) Prior Publication Data
US 2016/0269101 A1    Sep. 15, 2016

Related U.S. Application Data

(60) Provisional application No. 62/131,702, filed on Mar. 11, 2015.

(51) Int. Cl.
*H04B 10/02* (2006.01)
*H04B 7/185* (2006.01)
(Continued)

(52) U.S. Cl.
CPC ....... *H04B 7/18521* (2013.01); *B64G 1/1007* (2013.01); *B64G 1/40* (2013.01);
(Continued)

(58) Field of Classification Search
CPC ............... H04B 10/29; H04B 7/18521; H04B 7/18513; B64G 1/1007; B64G 1/40; B64G 1/646
(Continued)

(56) References Cited

U.S. PATENT DOCUMENTS 4,279,036 A * 7/1981 Pfund .................. H04B 10/118
250/203.1
4,985,706 A * 1/1991 Schukat .................. H04L 23/02
244/1 R
(Continued)

OTHER PUBLICATIONS

International Search Report and Written Opinion issued in PCT/US2016/022038, dated Jun. 2, 2016 (12 pages).
(Continued)

*Primary Examiner* — M. R. Sedighian
(74) *Attorney, Agent, or Firm* — Wilmer Cutler Pickering Hale and Dorr LLP

(57) ABSTRACT

A dedicated satellite to reduce the cost and increase the rate and reliability of data transmission from space to ground is provided. For each client satellite producing data in Earth orbit, a dedicated relay satellite is provided. The relay satellite may fly near the client satellite and receive data from the client satellite by RF communication. The relay satellite may transmit the data to a ground terminal or to another satellite using a laser communication system. Because the relay satellite is not physically connected to the client satellite, the attitude-control requirements of an optical communication system are not imposed on the client satellite. The relay satellite may also be deployed from the client satellite. The relay satellite may allow downlinking large amounts of data for new satellite operators without an existing ground network and for established satellite operators seeking higher data rates, lower latency, or reduced ground system operating costs.

5 Claims, 3 Drawing Sheets

(51) Int. Cl.
  *H04B 10/29* (2013.01)
  *B64G 1/10* (2006.01)
  *B64G 1/64* (2006.01)
  *B64G 1/40* (2006.01)
(52) U.S. Cl.
  CPC ......... *B64G 1/646* (2013.01); *H04B 7/18513* (2013.01); *H04B 10/29* (2013.01)
(58) Field of Classification Search
  USPC .......................................................... 398/173
  See application file for complete search history.

(56) References Cited

U.S. PATENT DOCUMENTS

| | | | | |
|---|---|---|---|---|
| 5,561,837 A * | 10/1996 | Muller | ............... | H04B 7/18576 455/12.1 |
| 5,758,261 A * | 5/1998 | Wiedeman | ........... | H04B 7/1856 455/13.1 |
| 5,931,419 A | 8/1999 | Collyer | | |
| 2012/0020280 A1 * | 1/2012 | Jansson | ............... | H04B 7/18582 370/316 |
| 2012/0184208 A1 * | 7/2012 | Renouard | .......... | H04B 7/18521 455/12.1 |
| 2012/0300815 A1 * | 11/2012 | Tronc | ................. | H04B 7/18521 375/147 |
| 2013/0119204 A1 * | 5/2013 | Allen | ....................... | B64G 1/64 244/172.5 |
| 2014/0354477 A1 * | 12/2014 | Robinson | ................ | G01S 19/11 342/357.78 |

OTHER PUBLICATIONS

Janson, Siegfried W., "Electric Propulsion for Low Earth Orbit Constellation Morphing", 38th AIAA/ASME/SAE/ASEE Joint Propulsion Conference, Indianapolis, Indiana, pp. 1-11 (2002) (11 pages).

* cited by examiner

CO-ORBITING LASER COMMUNICATIONS RELAY SATELLITE

CROSS-REFERENCE TO RELATED APPLICATIONS

This application claims priority to U.S. Provisional Patent Application No. 62/131,702, filed Mar. 11, 2015, entitled "Co-Orbiting Laser Communications Relay Satellite," which is hereby incorporated by reference in its entirety.

FIELD

The present invention relates to an application of a relay satellite, and in particular, a communications relay satellite.

BACKGROUND

Recent progress in sensor technology has allowed low Earth orbit (LEO) satellites to shrink significantly in size, disrupting a legacy industry where traditional satellites cost 500 million dollars to 1 billion dollars to build and launch. Major investments are being made to address the new opportunities that this provide for data collection, and many companies are launching nanosatellites and/or microsatellites into LEO to capture this opportunity. The rapidly expanding satellite infrastructure is generating vast amounts of data, reaching nearly 20 PB/year in 2014, with no signs that the trend will level off. To bring all that data down from LEO requires an average communication rate of 5 Gb/s, continuously, and that demand will continue to grow.

Typically, most satellites download data via space-to-ground radio-frequency (RF) links, communicating directly with fixed ground stations as the satellites fly within range. The current ground station infrastructure has several key limitations that present significant challenges as the satellite industry continues to grow. Satellite-to-ground communications are "line-of-sight," meaning that ground stations must receive data only from satellites that are directly above the local horizon. The duration of a satellite passes over a ground station depends on the altitude of the satellite and the distance between the ground station and the ground track of the satellite. With satellites in LEO, the maximum pass duration is typically less than ten minutes.

The frequency of passes is strongly dependent on the satellite orbit parameters and the location of the ground station. For example, a satellite in equatorial orbit will pass over an equatorial ground station on each orbit. This means that with a typical orbital period of 90 minutes, the satellite will pass the ground station 16 times per day. Similarly, a satellite in a polar orbit will pass over a ground station located at the North Pole once per orbit. On the other hand, the satellite in polar orbit will pass over the equatorial ground station between two and four times per day depending on the alignment of the ground track with the location of the ground station.

However, it should be noted that the satellite in equatorial orbit will never pass over the polar ground station. Most LEO satellites are in orbits at some inclination between equatorial and polar, and most ground stations are located at latitudes well south of the North Pole. As such, the pass frequency for any given satellite over any given ground location will typically be three to five times per day for ground stations that are not at high latitude (above about 60 degrees) and not at latitudes higher than the orbital inclination of the satellite.

The consequence of limitations on pass duration and frequency is that a satellite will be within communication range of a given ground station for no more than 10 percent of a day, and typically for less than 2 percent of the day. These constraints on pass duration and pass frequency are driven by orbital dynamics and can be overcome only by increasing the number of ground stations or locating the ground stations at very high latitudes. However, increasing the number of ground stations require a large amount of capital investment. Furthermore, avoiding downlink constraints requires a large number of geographically diverse ground stations that are inherently underutilized.

To compensate for the limitations on ground contact time, the data transmission rate during what contact time is available is increased. High data rates in the RF require some combination of high transmitter power and high-gain antennas on the satellite and the ground station. High power transmitters and high-gain antennas on the space segment are constrained by power and mass limitations on the satellite. High-gain antennas on the ground are not mass limited, but tend to be very large (10 meters or more in diameter) and require significant capital investment.

As data produced in LEO increases substantially with more satellites launched, downlink infrastructure must grow to meet demand. However, a more fundamental limitation to downlink rates will be encountered in the future, simply due to the overuse of available RF bandwidth in the space environment. Furthermore, simply adding new RF ground terminals will not solve the problem, because the ground stations will start to interfere with one another. Similarly, RF bandwidth is constrained on the space side. For example, when two satellites are relatively close to one another, their RF signals can interfere.

For new satellite companies leveraging advances in satellite costs, capital investment for an extended ground station network is particularly burdensome because the size and cost of the ground network does not scale with the size of the satellites. Ground station costs have not scaled at the same rate as satellite costs, requiring significant investment to match growth in satellite capacity.

Laser communication has the potential to provide data rates adequate to handle all the data generated on orbit for the foreseeable future. However, current laser communication technology requires installation of expensive laser transmitters on each satellite, and places operational constraints on the satellite (pointing, jitter, etc.) that are often beyond the capability of budget satellites.

A distributed constellation of satellites in Earth orbit, called network satellites, may enhance the utility of client satellites in Earth orbit by providing a high-bandwidth data link to ground. Client satellites may include any satellite in Earth orbit that collects data at a high rate, where high can mean that satellite operations are constrained by availability of communications bandwidth, or that satellite operations requires one or more dedicated ground stations. The network satellites may receive data at close range from the client satellites, and subsequently transfer the client data to the ground using optical communication. The system may also include several widely-distributed optical ground stations for receiving data from the network satellites.

However, this system includes limitations. For example, the network satellites, unless in the same orbit as the client satellite, will be close to the client satellite for only brief time periods. To provide reliable and ubiquitous coverage for client satellites with non-co-orbiting network satellites would require a large number of network satellites. In addition, existing client satellites are typically three-axis stabilized, and configured to transmit toward ground. If a network satellite is co-orbiting with the client satellite, it will be either ahead of, or behind, the client satellite in its orbit, and will not be in a position to receive data from the client satellite's primary ground link antenna.

Thus, dedicated communications relay satellites may be beneficial.

SUMMARY

Certain embodiments of the present invention may provide solutions to the problems and needs in the art that have not yet been fully identified, appreciated, or solved by current satellites. For example, in some embodiments, a dedicated communications relay satellite (hereinafter "relay satellite") is placed in a quasi-orbit about a client satellite. In one or more embodiments, the relay satellite may pass between the client satellite and the Earth once per orbit, passing through the normal communications beam of the client satellite. The relay satellite may receive data from the client satellite over a short-range low-power link and then retransmit the data over a long-range link, such as an optical link, to another satellite node, or directly to the ground.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

In one or more embodiments, a relay satellite may include a receiver for receiving data from a client satellite, memory for storing that data on board the relay satellite, and a transmitter for transmitting that data to another satellite or to the ground. The relay satellite may be launched in an orbit where the relay satellite becomes a quasi-satellite of the client satellite. In one embodiment, a quasi-satellite may be a second object in a co-orbital configuration with a first object. In such an embodiment, both objects orbit in a gravitational field, e.g., around the Earth, with the same period and in nearly the same orbit.

However, it should be appreciated that the second object orbits with an eccentricity and/or inclination slightly different from the first object. For example, in a coordinate system centered on the first object, the second object may appear to be orbiting the first object with a period equal to the period of the two objects orbiting in the primary gravitational field. The second object may be in a quasi-orbit about the first object. Alternatively, the first object may be considered to be in a quasi-orbit about the second object. In either case, the distinction is purely a matter of selecting the appropriate coordinate system.

In one embodiment, the relay satellite may be in an orbit that allows it to pass directly between the client satellite and the Earth. As such, the relay satellite may pass through the beam of the downlink antenna of the client satellite once per orbit. This may be accomplished by placing the relay satellite in an orbit with the same period and inclination as the client satellite, but with a different eccentricity.

Figure 1:
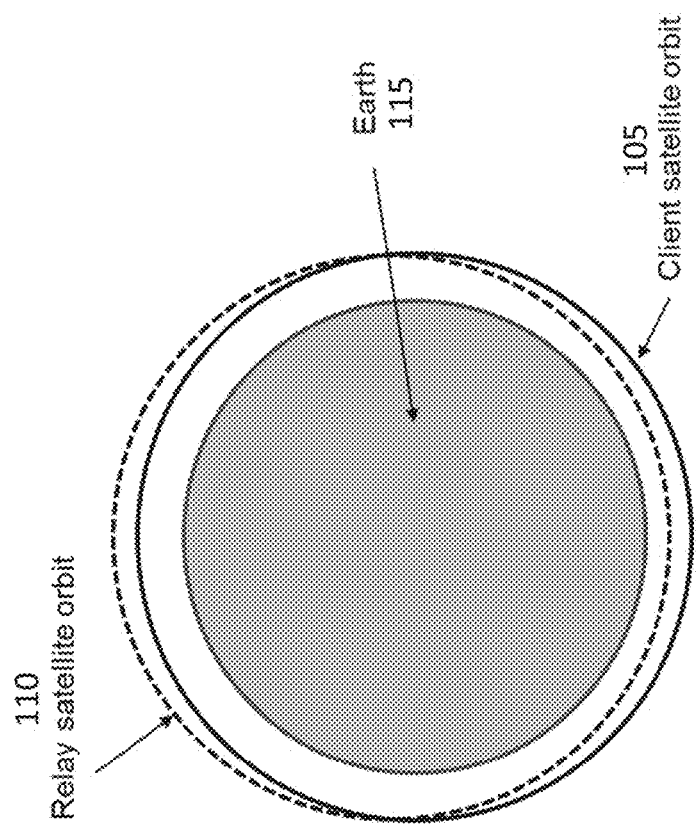
FIG. 1 is a view illustrating a client satellite and a relay satellite orbiting in an Earth-centered frame, according to an embodiment of the present invention.

FIG. 1 is a view 100 illustrating a satellite orbiting in an Earth-centered frame, according to an embodiment of the present invention. In this embodiment, the client satellite and the relay satellite orbit about Earth 115 in an Earth-centered coordinate system. For simplicity, the client satellite is shown in a circular orbit 105 while the relay satellite is shown in an elliptical orbit 110. In other embodiments, the relay satellite may be in a circular orbit and the client satellite may be in an elliptical orbit. In yet another embodiment, both client and relay satellites may be in elliptical orbits with differing eccentricities. The eccentricity of relay satellite orbit 110 is exaggerated for clarity in FIG. 1.

Figure 2:
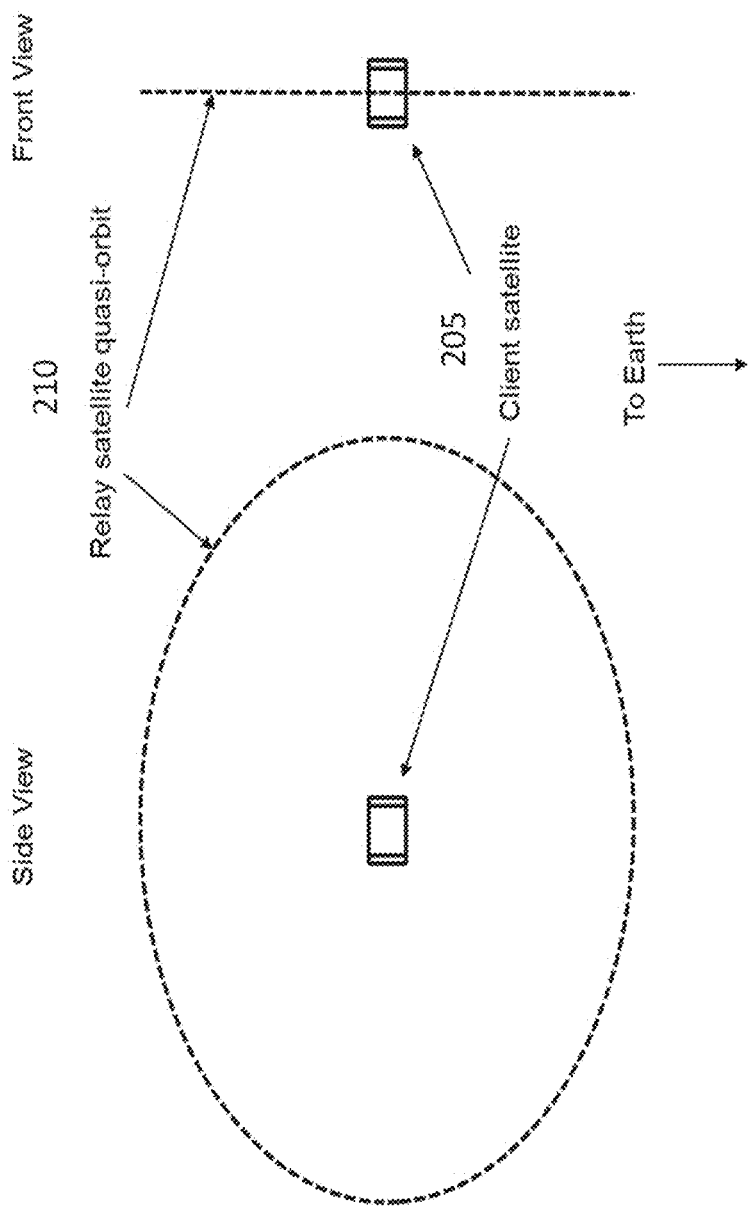
FIG. 2 illustrates a relay satellite quasi-orbit in a client centered frame with coplanar orbits having different eccentricities, according to an embodiment of the present invention.

In FIG. 2, the same orbits shown in FIG. 1 are now shown in a coordinate system centered on client satellite 205. In this embodiment, the relay satellite may have a quasi-orbit 210 about client satellite 205. The period of quasi-orbit 210 will be the same as the period of client satellite 205 about the Earth.

Alternatively, if it is deemed detrimental to client satellite 205 to have the relay satellite passing through the client satellite's 205 field of view of the ground, then the relay satellite can be placed in an orbit that has both an eccentricity difference and a slight inclination difference relative to client satellite 205.

Figure 3:
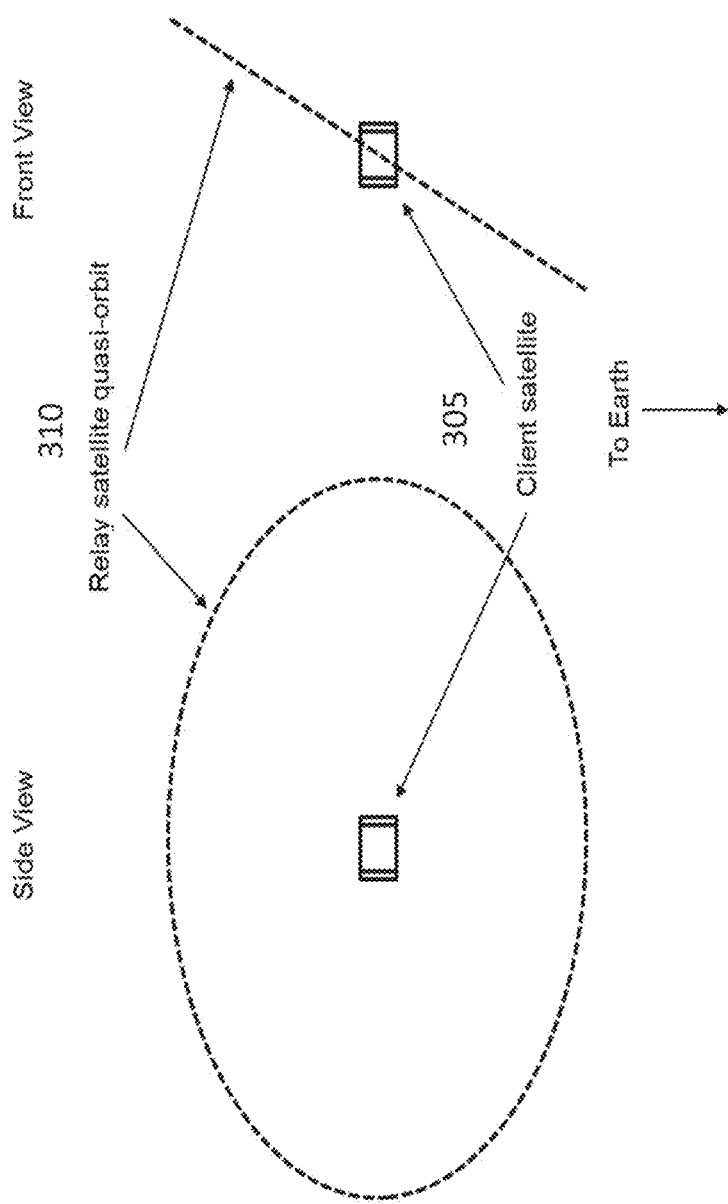
FIG. 3 illustrates a relay satellite quasi-orbit in a client-centered frame with non-coplanar orbits having different eccentricities, according to an embodiment of the present invention.

FIG. 3 shows, for example, orbits in a coordinate system centered on client satellite 305. In this embodiment, the relay satellite may be in a quasi-orbit 310 about client satellite 305. In such an embodiment, quasi-orbit 310 may be inclined with respect to the plane of the orbit of client satellite 305 about the Earth. The period of the quasi-orbit 310 may be the same as the period of client satellite 305 about the Earth.

The radius of the quasi-orbit, in either case, can be selected according to the preferences of the owner and/or operator of the client satellite, and the requirements of the RF link between the client satellite and the relay satellite. As the quasi-orbit radius decreases, the strength of the RF link may improve, increasing the rate of data transfer. However, a smaller quasi-orbit radius may increase the potential for collision between the relay satellite and the client satellite, and places tighter constraints on station-keeping for relay satellite. In general, the station-keeping requirements on the relay satellite may be similar to those of the client satellite.

In FIG. 2 and FIG. 3, the relay satellite is shown in a quasi-orbit about the client satellite that is centered on the client satellite. It should be understood that the quasi-orbit is not controlled by the gravitational attraction between the client satellite and the relay satellite; the quasi-orbit is an artifact of the relative orbits of the client satellite and the relay satellite both about the Earth. As such, it is not necessary that the quasi-orbit be centered on the client satellite. In an embodiment of this invention, the center of the quasi orbit may be displaced along the orbital track of the client satellite. From the perspective of the quasi orbit, the client satellite is displaced from the center of the quasi orbit. If the center of the quasi-orbit is displaced from the client satellite a distance greater than the radius of the quasi-orbit, then the radius of the quasi-orbit may be made arbitrarily small without risk to the client satellite. In the limiting case of a zero-radius quasi orbit displaced along the orbital path of the client satellite, the client satellite and the relay satellite are in the same orbit but with an in-track offset that keeps the relay satellite and the client satellite within a pre-determined distance.

The relay satellite may include one or more RF receivers configured to receive on communications bands normally used by the client satellite for communications with the ground. The short-range communications with relay satellite may be performed at a power level substantially below that required for communications directly to ground, presenting a cost savings for satellite operators. In addition, the use of short-range communications may reduce the demand for RF bandwidth in space communications. The radio frequency selected for short range communication between the client satellite and the relay satellite may be one that does not penetrate the Earth's atmosphere, such that the selected radio frequency is a frequency that is not normally used for space-to-ground communications.

The relay satellite may also include a laser communication transmitter configured to transmit data at rates above 100 Mb/s, and in some embodiments, above 1 Gb/s. For example, the laser communication system for the relay satellites may utilize the laser system developed for Aero-Cube-OCSD. This laser is a 10-W Master Oscillator Fiber Amplifier (MOFA) configuration capable of encoding data at 500 Mb/s. Changes to the electronics and software may allow this laser to reach gigabit rates. This may be high enough such that the potential data rates that can be achieved through the use of the relay satellite depends on the capacity of the RF link between the client satellite and the relay satellite. In certain embodiments, the entire laser may be included within a package that is about 10 cm square and 2.5 cm thick. The power supply (e.g., in the form of batteries) may occupy an additional volume of about 10 by 5 by 2 cm. As such, this laser may easily fit in a CubeSat form factor, and provide the necessary downlink capacity.

If, however, the data capacity of a single relay satellite is insufficient to meet the requirements of client satellite, it may also be possible to include more than one relay satellite for each client satellite. The multiple relay satellites may operate in orbits phased with one another to maximize availability of relay satellites as a function of time.

The ground station, which receives data from the communication laser, may include an optical telescope that is larger than 30-cm. Such telescopes may be available in the amateur-astronomy market. The drive systems produced for astronomy applications, however, are not typically adequate for precision tracking of objects in LEO. As a result, an upgraded system may be necessary. Such tracking systems may be available, and may operate autonomously given knowledge of the anticipated location of the relay satellites. Such knowledge can be obtained using on-board GPS receivers on each of the relay satellites. In addition, the ground systems can use the communication beam from the relay satellite to enable closed-loop pointing for higher precision once the beam has been acquired.

The relay satellite may operate in a store-and-forward mode or in a continuous communication mode when other network nodes are visible. In the store-and-forward mode, data may be transferred from the client satellite to the relay satellite whenever convenient. The data may be transferred from the client satellite to the relay satellite at any data rate convenient for the client satellite. The collected data may be stored on the relay satellite until the relay satellite passes over an available optical ground station. When the relay satellite passes over an available optical ground station, the data may be downloaded using the laser communication system. The data may be transferred using terrestrial networks, or high-capacity space relay networks, from the optical ground station to the user's destination.

Because the relay satellite may be small and simple, a 3U (or smaller) CubeSat may be adequate. Furthermore, because the ground stations are far less expensive than RF ground stations with comparable data rates, the overall cost of the system can be quite modest.

Because the relay satellite is small in size, the relay satellite may be incorporated in the design of new client satellites with the intention of launching the client and relay satellites in a single package and deploying the relay satellite from the client satellite after it reaches orbit. Launching the client and relay satellites together may minimize the propulsion requirements for the relay satellite. For example, co-launch may simplify the needed propulsion for launch and deployment by placing the satellites into a similar orbit, minimizing the amount of delta-v required to place the satellites into a quasi-orbit. In some embodiments, multiple relay satellites may be deployed simultaneously for increased capacity, or deployed as needed to replace relay satellites lost due to malfunction or excessive orbital decay. In further embodiments, the client satellite and relay satellite may be configured such that the relay satellites may re-dock with the client satellite, for example, to replenish propellant for station keeping.

The motivation for deploying a relay satellite rather than leaving it attached to the client satellite is that the attitude-control requirements of the laser-communication system are likely to be more stringent than, or incompatible with, the attitude-control requirements for the client satellite. Currently, when a laser communication system is mounted on a satellite, it is connected with a complex gimbal system that allows the laser to point in the required direction and with its required degree of precision. Such gimbal systems, however, tend to be quite expensive. In addition, with any gimbaled system, the pointing direction of the laser is never independent of the attitude of the primary satellite, with consequent constraints on operation of the laser communication system. The deployable relay satellite may provide an alternative technique that separates the attitude-control requirements of the data collection system and the laser system, and may make the laser communication completely independent of the attitude of the primary satellite.

The relay satellite described above provides many potential benefits to established satellite operators with existing RF downlink networks and to newer satellite operators who may not have the resources to establish their own RF downlink network. In some embodiments, the relay satellite may provide a communication solution to satellite operators unwilling to establish their own RF downlink network. They relay satellite may also provide higher data rates than are available with existing RF systems.

Optical communication may provide improved data security because the beam diameter can be substantially smaller than comparable RF systems. During operation, it may be possible to make the beam ground footprint as small as a few tens of meters. As a result, it may be possible to maintain ownership/control over the entire ground footprint, substantially reducing opportunities for eavesdropping. It should be appreciated that optical communications may be less susceptible to interference and harder to jam than RF communications.

In one or more embodiments, the relay satellite may provide reduced data latency compared to single-user systems. The relay satellite may also provide for higher utilization of the space assets by offloading the data transmission task and reducing data storage requirements. Furthermore, the relay satellite may provide for a reduced satellite power envelope by reducing transmission power requirements, and provide higher availability by having widely distributed ground systems that will limit outages due to atmospheric conditions.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A relay satellite for relaying data from a client satellite to thereby reduce power and pointing accuracy requirements of the client satellite, said relay satellite comprising:
   a short-range communications link configured to receive data from the client satellite; and
   a long-range communications link configured to retransmit the received data to a ground station or another satellite,
   wherein the relay satellite is deployed in one of (a) a quasi-orbit with respect to the client satellite such that the relay satellite and the client satellite can be kept within a pre-determined distance or (b) the same orbit as the client satellite but with an in-track offset that keeps the relay satellite and the client satellite within a pre-determined distance;
   wherein the short-range communications link can be used to receive data from the client satellite when the client satellite is within a pre-determined distance of the relay satellite;
   wherein the relay satellite is deployable from the client satellite after the client satellite reaches orbit.

2. The relay satellite of claim 1, wherein the relay satellite further comprises a docking mechanism configured to dock the relay satellite with the client satellite.

3. The relay satellite of claim 2, wherein the docking mechanism comprises a fuel transfer mechanism configured to transfer propellant between the client satellite and the relay satellite.

4. A satellite network comprising a plurality of relay satellites, as described in claim 1, wherein the plurality of relay satellites are each configured to receive data from the same client satellite and wherein the plurality of relay satellites are each in quasi-orbits phased as a function of time with respect to the client satellite.

5. A method of relaying data using a relay satellite to thereby reduce power and pointing accuracy requirements of the client satellite, comprising:
   deploying the relay satellite in one of (a) a quasi-orbit with respect to the client satellite such that the relay satellite and the client satellite can be kept within a pre-determined distance or (b) the same orbit as the client satellite but with an in-track offset that keeps the relay satellite and the client satellite within a pre-determined distance;
   the relay satellite receiving data from a client satellite via a radio communications link; and
   transmitting the received data from the relay satellite to a ground station or another satellite using an optical communication link;
   wherein the short-range communications link can be used to receive data from the client satellite when the client satellite is within a pre-determined distance of the relay satellite;
   wherein the relay satellite is one of a plurality of relay satellites, wherein the quasi-orbit of the relay satellite is one of a plurality of phased quasi-orbits, and wherein the other relay satellites of the plurality of relay satellites are in the other phased quasi-orbits of the plurality of phased quasi-orbits.

* * * * *